July 21, 1959  G. KRONACHER  2,896,160
TIME INTERVAL ENCODER
Filed Sept. 20, 1954  3 Sheets-Sheet 1

INVENTOR
G. KRONACHER
BY
H. O. Wright
ATTORNEY

July 21, 1959 G. KRONACHER 2,896,160
TIME INTERVAL ENCODER
Filed Sept. 20, 1954 3 Sheets-Sheet 2

INVENTOR
G. KRONACHER
BY
H. O. Wright
ATTORNEY

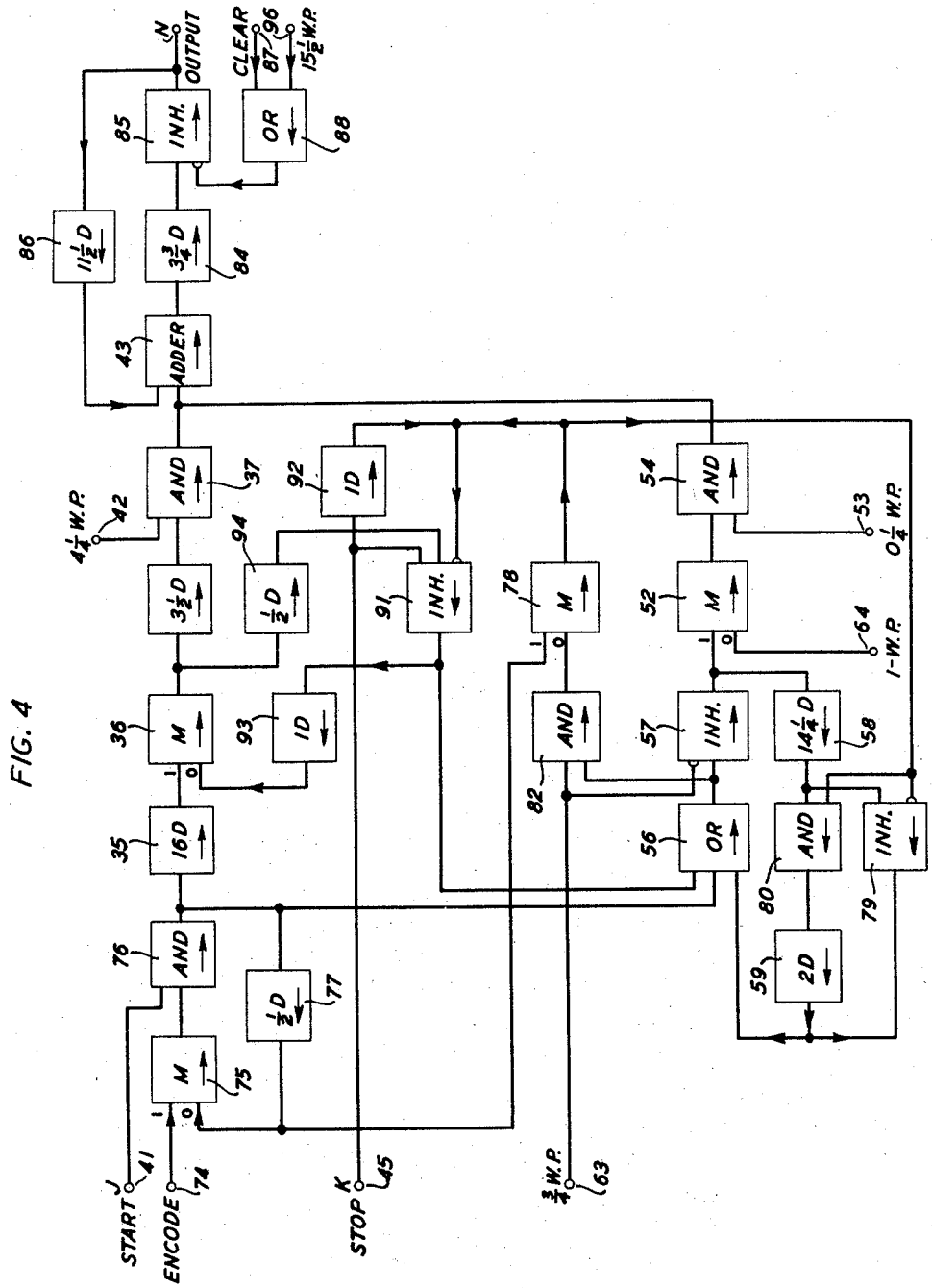

United States Patent Office 2,896,160
Patented July 21, 1959

2,896,160

TIME INTERVAL ENCODER

Gerald Kronacher, Newark, N.J., assignor to Bell Telephone Laboratories, Incorporated, New York, N.Y., a corporation of New York Application September 20, 1954, Serial No. 457,126

12 Claims. (Cl. 324—68)

This invention relates to circuits for measuring time intervals and for representing the duration of the timed intervals in digital form.

It has previously been proposed to measure the elapsed time between two electrical signals by gating a standard frequency source through a control circuit to an accumulator during the period between the two signals. Thus, for example, when a source of pulses occurring at one second intervals is connected by a switch to an accumulator, and the switch is closed briefly, the number read from the accumulator after the opening of the switch indicates in seconds the length of time that the switch was closed. When the time measurement circuits are to be incorporated into a computer apparatus, however, the accuracy of the time measurements may be limited by the speed at which the accumulator associated with the apparatus can operate.

Accordingly, the principal object of the present invention is to increase the accuracy of time measurement systems in which pulses from a standard frequency source are counted by a computer apparatus during the interval which is to be measured.

Another object of the invention is to reduce the complexity of circuits which measure both the time interval between the occurrence of a pulse and a subsequent timing pulse, and also the time interval between the occurrence of another pulse and a preceding timing pulse.

Other and further objects will become apparent during the course of the detailed description of illustrative arrangements of the invention, and from the appended claims.

In accordance with the invention, time may be measured to a fractional part of the operating period of the accumulator with which the timing circuits are associated by gating two sets of pulses into the accumulator, one of the sets of pulses indicating the number of elapsed operating periods of said accumulator, and the other indicating the number of excess fractional parts of said operating periods at the beginning and the end of the interval to be timed. These two sets of pulses are appropriately weighted and are combined to form a single binary number which the accumulator accepts at its normal operating speed. The circuit for measuring fractional parts of the operating periods uses a delay loop which differs in length from the operating period of said accumulator by one fractional part of said period, and is considered to be an important part of the invention.

The invention will be more readily understood by referring to the following description taken in conjunction with the accompanying drawings forming a part thereof; in which:

Fig. 4 represents the complete logical circuit diagram of the present time interval encoder.

Figure 1:
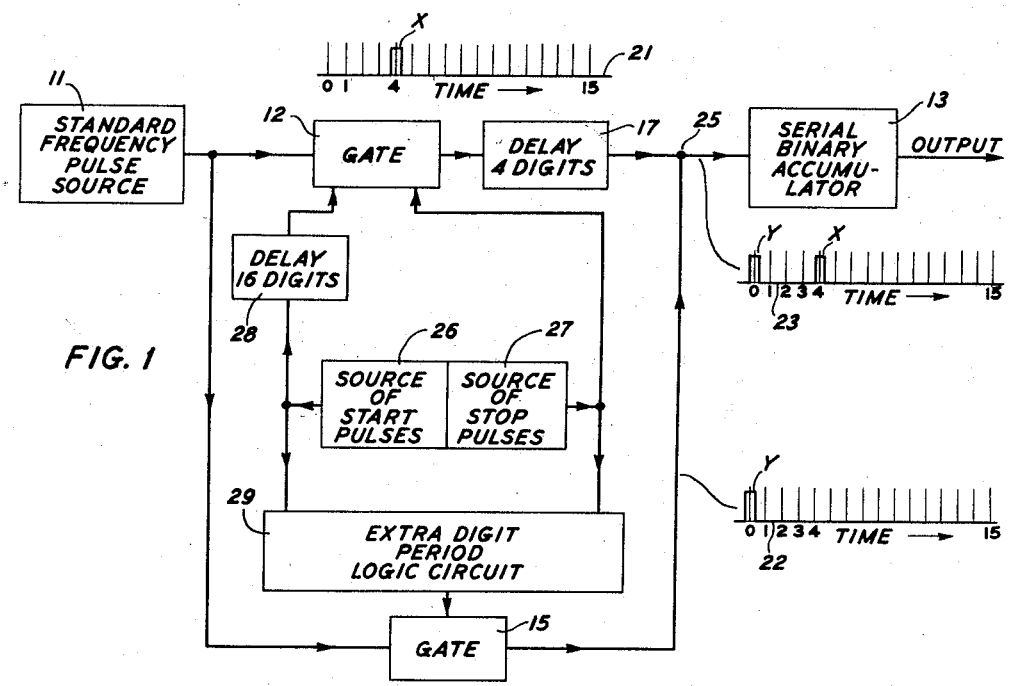
Fig. 1 is a block diagram of the circuits of the present invention.

Referring more particularly to the drawings, Fig. 1 shows, by way of example and for purposes of illustration, a simplified block diagram of the time interval encoder in accordance with the present invention. In Fig. 1, the three boxes 11, 12 and 13 represent an interval timer of limited precision which is well known in the prior art. In the simple type of interval timer represented by these three boxes, the gate 12 is opened during the timed interval, and gates a number of pulses from the standard pulse source 11 through to the accumulator 13. The number of standard pulses counted by the accumulator 13 will then indicate the length of the timed interval.

However, in a simple system such as that described above, in which only a frequency source 11, a gate 12, and an accumulator 13 are employed, the precision of time measurement is limited by the speed of operation of the accumulator 13. For example, the time interval encoder disclosed herein is designed for use with a computer system in which numbers are added at a 16 microsecond rate. More specifically, the present serial binary accumulator 13 has but one information input terminal and one information output terminal. At its input terminal it accepts 16 digit serial binary numbers (or words). Successive digits of the serial number are spaced by one digit period, which is one microsecond long.

To facilitate an understanding of the circuit description which follows, it appears desirable to discuss the above-mentioned timing relationships in somewhat greater detail. The one microsecond digit pulses and the groups of 16 digit pulses or spaces forming 16 microsecond word periods constitute a time frame of reference for many of the operations in the present time interval encoder circuits. The 16 digit time slots in each word period are numbered from 0 to 15 for reference purposes, the first and least significant digit being designated 0 and the last digit being designated 15. For example, number 3 word pulses are pulses occurring at 16 microsecond intervals in the fourth digit time slot of each word period.

Returning to the circuit of Fig. 1, the precision of the interval timer has been increased beyond the operating period of the accumulator (16 microseconds) by the use of a second train of pulses which represent subdivisions of the operating period of the accumulator. For convenience, the operating period, or "word" repetition rate, of the serial accumulator 13 is divided into 16 subdivisions, corresponding to the pulse repetition rate of the individual digits which make up the multidigit numbers or "words." In the measurement of time intervals to the nearest digit period, the upper path through gate 12 passes a group of pulses, designated "X" in the drawings, representing the number of integral word periods in the measured time interval; and the lower path through gate 15 passes a group of pulses, designated "Y" in the drawings, which represent the number of extra digit periods at the beginning and end of the time period, in addition to complete word periods.

In the serial binary accumulator 13 the least significant digits pass through the adder first in time, and each digit has a weight of two as compared with the preceding digit. Therefore, before the pulse trains X and Y are combined to form a single binary number at the input of the accumulator 13, the four digit delay unit 17 may be inserted in the path of the pulse train X. This four unit delay line increases the significance of the X pulses representing word periods by a factor of $2^4$, or 16, as compared with the Y pulses which represent digit periods. With digit periods being one-sixteenth as long as word periods, the two pulse groups are now appropriately weighted. The timing of the pulse trains X and Y is shown in the plots 21, 22 and 23, which show the position of the pulses X and Y in a word frame, before and after combination at point 25 at the input to the accumulator 13.

A pulse from the source of start pulses 26 initiates the timing operation, and a pulse from the source of stop pulses 27 indicates the end of the time interval which is to be measured. The 16 digit delay unit 28 may be employed to effectively cancel the first X pulse, and thus eliminate a biasing error. In a repetitive operation, however, it may prove to be less expensive to omit the delay unit 28 and to introduce a compensating bias at another point in the apparatus. The extra digit period logic circuit 29 converts the number of extra digit periods at the beginning and the end of the measured time interval into word periods, and opens the gate 15 for a number of word periods corresponding to these extra digit periods. Stop pulses are not admitted to the logic circuits until the logical operations associated with the start pulses are completed. The specific logical circuitry by which the foregoing is accomplished will be described in greater detail in conjunction with Figs. 2 and 4.

Figure 2:
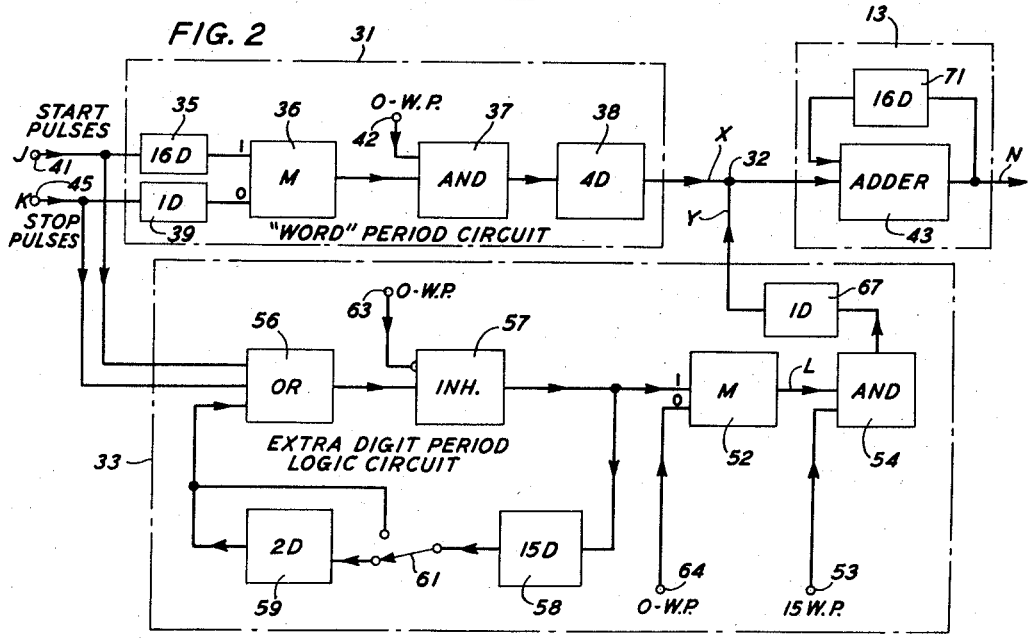
Fig. 2 is a simplified logical circuit diagram of the time interval encoder of Fig. 1.

The instrumentation of the present invention will now be described by reference to the simplified logical circuit diagram of Fig. 2. In this diagram the circuits are shown in terms of the "building blocks" or basic packaged circuits which may be employed in a digital computer. While the specific circuits which have been employed in these basic computer components have taken many different forms, one satisfactory set of packages is disclosed in the article entitled "Regenerative Amplifier for Digital Computer Applications," by J. H. Felker, which appeared at pages 1584–1596 of the November 1952 issue of the "Proceedings of the I.R.E." (volume 40, Number 11). The five basic logical circuit elements which are disclosed on pages 1594 and 1595 of this article, and which are employed in the circuit diagram of Fig. 2, are as follows:

The Or unit yields a pulse output if a pulse is present at any of the inputs to the unit.

The And unit requires energization of all inputs to yield an output.

The "Inhibit" unit, which is designated "Inh," is generally similar to an And unit, in that all of the normal inputs to the unit must be energized for it to yield an output pulse. However, a pulse on the inhibit input lead (marked with a semicircle at the point where the inhibit lead connects to the inhibit box) will over-ride all other signals and block the output of the unit.

A memory unit, designated "M," may be set to either of two conditions, the "0" state or the "1" state. When set to the "0" state it has no output. When the "set 1" lead has been energized, however, the memory unit generates pulses, one at each digit interval, until the memory unit is reset to the "0" condition. When both input leads are energized simultaneously a memory unit assumes the "0" state, and has no output.

Delay units are indicated by boxes with the letter "D" therein, together with a number indicating the number of digit times of delay included in the unit. The first four logic elements noted above also introduce a delay of one-quarter digit period or one-quarter microsecond. These delays are ignored in the simplified circuit of Fig. 2; however, they are taken into account in the detailed circuit of Fig. 4.

As disclosed in the article by Mr. Felker cited above, the pulse regenerator is an important part of these logical circuits. While the specific circuit shown in the Felker article operated satisfactorily, an improved version of the regenerator appears in J. H. Felker application Serial No. 376,923, filed August 27, 1953, assigned to the same assignee as the present application, now Patent No. 2,853,629.

Returning to the circuit of Fig. 2, the upper portion 31 of the circuit has an output at point 32 which represents the number of integral word periods included in the time interval to be measured, and the lower circuit 33 has an output to the same point 32 which indicates the extra digit periods at the beginning and end of the measured time interval.

The word period circuit 31 is made up of the 16 digit delay unit 35, the memory unit 36, the And unit 37, the four digit delay unit 38, and the one digit delay unit 39. A start pulse applied at terminal 41 sets the memory unit 36 to its "1" state after a delay of 16 digits, or one word period, introduced by delay unit 35. The memory unit 36 then produces a series of pulses coinciding with successive digit time slots, which energize one of the two inputs of the And circuit 37. The other input 42 of the And circuit 37 is energized by number "0" word pulses, and the And unit consequently produces output pulses once each word period in the digit time slot corresponding to the beginning of each word period. After a delay of four digits in the delay unit 38, the group of pulses representing integral word periods is applied to the input terminal 32 of the adder 43. A suitable adder is illustrated in Fig. 13 of the above-identified article by Mr. Felker. The occurrence of a stop pulse at terminal 45 resets memory 36 to "0" after delay in the one digit delay unit 39, and prevents the passage of additional word pulses from terminal 42 through the And unit 37. The delay unit 39 is required to obtain proper timing at the input to the memory unit 36.

The number "0" word pulses which are applied to terminal 42, as noted above, originate in a master pulse generator which is not shown in Fig. 2. The master pulse generator also generates digit pulses which synchronize the operations of the serial logic circuits of Figs. 2 and 4. The use of digit or "clock" pulses for synchronization is well known in the serial digital computer art. The word pulses, which have a 16 digit period repetition rate, are generated from the clock pulses by any desired frequency division circuit, and may, of course, be provided in any desired time position.

Figure 3A:
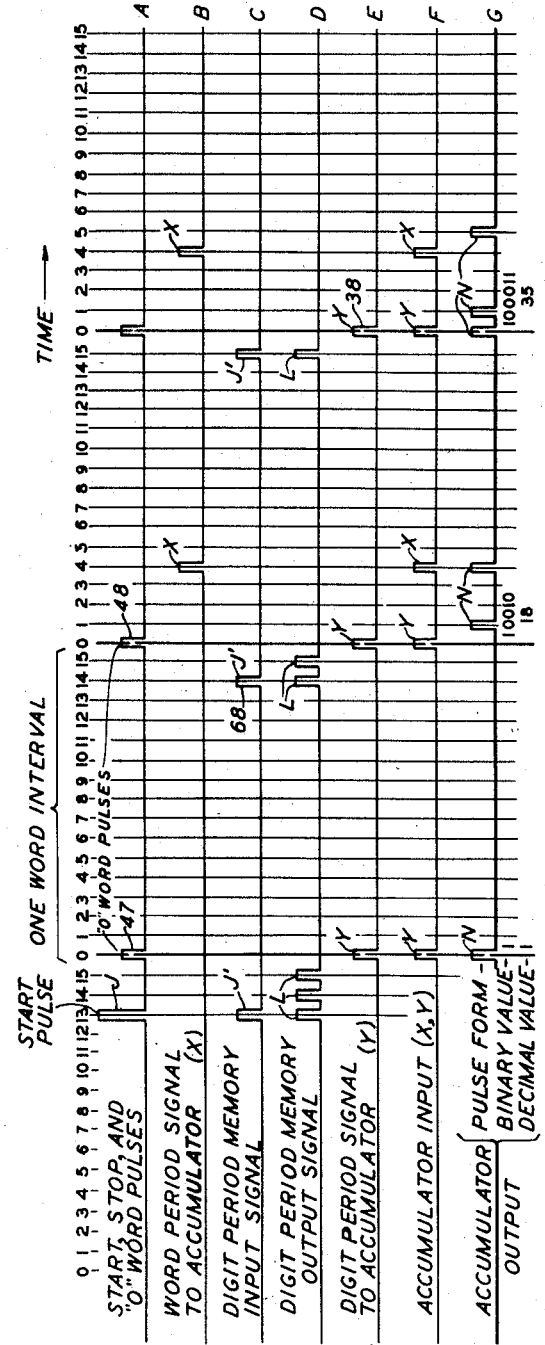
Figs. 3A and 3B are two parts of a diagram indicating the relationship of pulses in the timing circuits of Figs. 1 and 2.
Figure 3B:
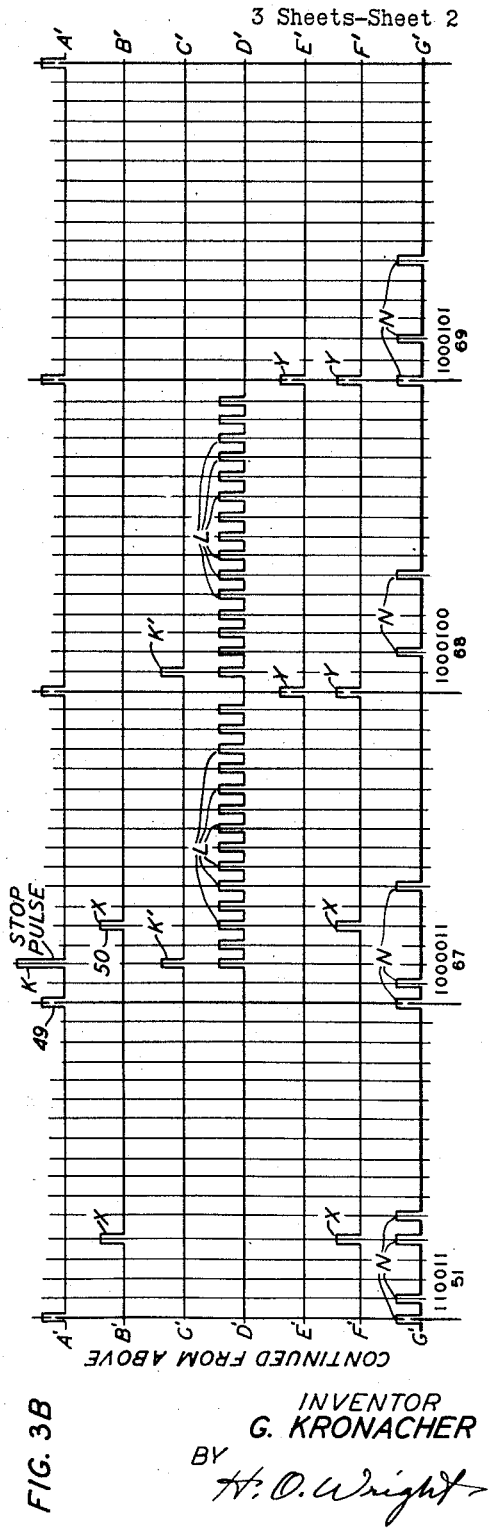

Before proceeding to consider the digit period logic circuit 33 of Fig. 2, the mode of operation of the word period circuit 31 will be discussed in connection with the diagram of Figs. 3A and 3B, which will be referred to hereinafter as the diagram of Fig. 3. This diagram of Fig. 3 plots pulses at various points in the circuit of Figs. 1 and 2 against time, in terms of digit and word periods. Referring to line A which is the first line of the diagram of Fig. 3, it may be observed that the start pulse J applied at terminal 41 of Fig. 2 occurs in digit time slot 13. The next "0" word pulse 47, applied at terminal 42, occurs three digit periods later in the zero digit time slot of the next word period. However, the start pulse J is delayed for 16 digit periods in the delay unit 35, and therefore has not yet set memory unit 36 to the "1" state. The first "0" word pulse is accordingly blocked by the And unit 37. This eliminates the biasing error which would oherwise be introduced by the insertion of an extra word pulse before a full word period has elapsed. The memory unit 36 is set to the "1" state three digit periods before the arrival of the next "0" word pulse 48, and accordingly, this pulse is gated through the And unit 37, and appears at the input 32 to the adder 43 after passing through the four digit delay unit 38. The pulses at this point in the circuit are labelled "X" and are shown in diagram 21 associated with Fig. 1 of the drawings, and on line B, which is the second line of the diagram of Fig. 3.

It should be noted that the pulse trains shown in Fig. 3 traverse Sheet 2 of the drawings twice, continuing from the upper right-hand portion to the lower left-hand portion of Fig. 3, with the upper set of pulse trains being labelled A through G and the corresponding lower set of pulse trains being designated A' through G', respectively. In pulse train A' which is in the first line of the lower series of plots, the stop pulse K is shown occurring in the second time slot after the start of a word interval. This stop pulse K immediately resets memory unit 36 to the "0" state, and prevents the passage of additional word pulses applied at terminal 42 through the And unit 37. However, the "0" word pulse 49 has already passed through the And gate 37 and results in X pulse 50, which may be observed below and to the right of pulse 49 in pulse train B', as it appears at the input to the adder 43. A review of the position of the start and stop pulses J and K shows that four integral word periods are included therebetween. The presence of four X pulses in pulse trains B and B' in the diagram of Fig. 3, representing these integral word periods, corroborates the foregoing analysis.

The digit period logic circuit in the lower portion of Fig. 2 is designed to measure the extra digit periods at the beginning and end of the measured time interval.

Referring to Fig. 3, the first of these two groups of extra diigt periods occurs in pulse train A between start pulse J and the first "0" word pulse 47, and the second group of extra digit periods occurs in pulse train A' between the "0" word pulse 49 and the stop pulse K.

The extra diigt period logic circuit 33 of Fig. 2 is somewhat more complex than the word period gating circuit 31 discussed above. The ultimate function of the extra digit circuit is to set the memory unit 52 to the "1" state and thus enable the And gate 54 prior to the appearance of word pulses at the input terminal 53 and to the And unit 54 for a number of word periods equal to the extra digit periods at the beginnnig and the end of the time interval to be measured, as will be explained in greater detail hereinafter.

To accomplish these results, a circuit loop is employed which includes the Or unit 56, the inhibit unit 57 and the 15 digit delay line 58. The two digit delay line 59 is also included in the circuit for logic operations associated with the extra digit periods at the beginning of the measured time interval, but not for digit periods at the end of the measured time intervals.

A start pulse is admitted to the delay loop 56, 57, 58, 59 by the Or unit 56. As noted above, the switch 61 will be in the lower position, and will therefore include the delay unit 59 to make a total of 17 digit periods of delay in the loop during the logic operations dealing with the extra digit periods at the beginning of the time interval. With 17 digits delay in the loop, the circulating start pulse is retarded by one digit time slot in its position with respect to a word frame of reference, with each passage around the loop. This is indicated in the diagram of Fig. 3 by pulse train C which bears the legend "Digit Period Memory Input Signal." The first three pulses in this pulse train are designated J' to indicate their derivation from the start pulse J. When the first start pulse J' passes through the Or unit 56, it occupies time slot 13 in the word period and, accordingly passes through the inhibit unit 57 to set the memory unit to its "1" state. If the start pulse had arrived at the Or unit during the "0" time slot of a word period, however, an "0" word pulse applied to the inhibit terminal 63 of the inhibit unit 57 would have blocked the pulse and prevented its circulation through the delay loop.

Since the first start pulse occurs in time slot 13 in the example illustrated in Fig. 3, the memory unit 52 is set to its "1" state, and produces a series of pulses at one digit period intervals until it is reset to its "0" state at the beginning of each new word period by the "0" word pulses applied to terminal 64. These output pulses appear in the pulse train D in Fig. 3, and are designated "L" to correspond with the similar designation of the lead at the output of the memory unit 52. With the start pulse arriving at the memory unit 52 at digit time 13, pulses L at the output of the memory will be present at digit time slots 13, 14, and 15, and will enable the And gate 54 during these time slots. Consequently, the next number "15" word pulse applied at terminal 53 will be gated through the And unit 54, and will proceed through the 1 digit delay unit 67 to the input terminal 32 of the adder 43. These pulses representing the extra digit periods are designated "Y" and appear in the fifth row of pulses in the diagram of Fig. 3.

After traversing the circuit loop once, the pulse J' which originated in time slot 13 has been delayed to time slot 14 as indicated at 68 in Fig. 3. After two trips around the delay loop, the pulse J' is in the 15th time slot, and is still passed through the inhibit unit 57 to set the memory unit 52 to its "1" state and gate another pulse designated Y through the And unit 54 to the adder 43.

After the pulse J' has passed around the delay loop three times, however, it appears at the input to the inhibit unit 57 in the "0" time slot, concurrently with a "0" word pulse applied to the inhibit terminal 63 associated with this unit. The pulse J' is accordingly blocked, and is thus removed from the delay loop after enabling the passage to the adder of three pulses representing the three extra digit periods at the beginning of the measured time interval.

The operation of the extra digit period logic circuit at the end of the measured time interval is very similar to its operation at the beginning of the period as discussed above, with the exception that switch 61 is moved to its upper position (by means such as will be described in detail in connection with Fig. 4) so that the delay loop is only 15 digit periods long. Accordingly, the pulse K', derived from the stop pulse K, is advanced by one digit period in each traversal of the loop and counts the number of extra digit periods between the stop pulse K and the preceding "0" word pulse 49 as shown in pulse train C', D', and E' in Fig. 3.

The accumulator is made up of the adder 43 and the 16 digit delay line 71 which routes the output of the adder back to its input to be combined with additional input information. Pulse trains F and G in the diagram of Fig. 3 show the input and output, respectively, of the accumulator during successive word periods. The pulses designated N represent the accumulator output. To bring out the significance of the pulse train G indicating the accumulator output, the number represented by the pulse train has been translated into binary and decimal form. Referring to the lower right hand portion of Fig. 3, the number 69 appears. This represents the number of digit periods included between start pulse J and stop pulse K. The number 69 is repeated in binary notation with the least significant digit to the right immediately above the point where it appears in decimal form. The pulse train G which appears above these numerals also represents the number in binary form, but with the least significant digit first in time and thus appearing to the left in the usual manner employed in serial binary computing apparatus.

In contrast to the simplified block diagram of Fig. 2, Fig. 4 is a detailed block diagram of a time interval encoder which has actually been built employing the transistor technology disclosed in the Felker article cited hereinabove. To show the basic identity of the circuits of Figs. 2 and 4, a number of the logic units and other circuits which appear in Fig. 4 have been given numbers corresponding to the comparable units of Fig. 2. One difference between the two circuits is the delay considerations. In the circuit of Fig. 2 it was assumed that the logic circuits such as the And, Or and inhibit units have no delay; in actual practice these units, when constructed in accordance with the Felker disclosure, have one-quarter microsecond or one-quarter digit period delay, and this is taken into account in the circuit of Fig. 4. Several additional circuits which perform subsidiary functions and which were omitted from Fig. 2 are also disclosed in Fig. 4.

Several of the circuit refinements which appear in Fig. 4 will now be considered. The first of these is the encode circuit which prepares the encoder for the reception of a pair of start and stop pulses. The encode signal is applied at terminal 74 and sets memory unit 75 to the "1" state. This applies a series of pulses to the And unit 76 and permits the passage of a start pulse applied at terminal 41 through the And circuit 76. The output pulse from the And unit 76, in addition to energizing the 16 digit delay unit 35 as disclosed in connection with Fig. 2, also is applied to the one-half digit delay unit 77. The output pulse from the delay unit 77 is applied to the reset terminal of the memory unit 75 and returns this memory unit to the "0" state. This blocks the entry of additional pulses which may be applied to start terminal 41 until another encode signal is received at terminal 74.

In Fig. 2 the delay loop for the extra digit period logic circuit was changed from 15 digits of delay to 17 digits of delay by means of the switch 61. The logical circuit means by which this switching action is instrumented will now be disclosed. Another output from the delay unit 77 is applied to the memory unit 78, indicating that a start signal has just been received. Pulses from the memory unit 78 are applied to the inhibit unit 79, and to the And unit 80. The inhibit unit 79 provides a short circuiting path around the two digit delay unit 59 when it is desired to change from 17 units delay to 15 units delay in the circuit loop. When pulses are present at the inhibit terminal of the unit 79 and are also present at the And unit 80, the short circuiting path through the inhibit unit is disabled, and the delay loop is 17 digits long. However, when there are no pulses at the output of the memory unit 78, the And gate 80 will be disabled, and the inhibit gate 79 will be enabled; and the digit period delay loop will have but 15 digits of delay. The memory unit 78 is reset to "0" by the presence of input signals on both terminals of the And unit 82. This occurs simultaneously with the blocking of the start pulse J', which is circulating in the 17 digit delay loop, when it appears at the input of the inhibit unit 57 concurrently with the three-quarter word pulse applied to the terminal 63.

After the time interval encoder has completed its cycle of operation, the encoded output of the adder 43 circulates in the loop made up of the adder 43, the three and three-quarter digit delay unit 84, the inhibit unit 85, and the eleven and one-half digit delay unit 86. These units have a total delay of 16 microseconds or digit periods and the circulating pulses therefore remain in synchronism with the balance of the logic circuitry. When the output information has been utilized, the delay loop may be cleared by applying a series of 16 pulses to the terminal 87 of the Or unit 88. This energizes the inhibit terminal of the inhibit unit 85 and prevents the passage of pulses therethrough.

The stop signal is admitted to the encoder by way of the inhibit unit 91. The inhibit terminal of the inhibit unit 91 is energized both by the output from the memory unit 78 and by the stop pulse after passage through the one digit delay unit 92. Energization of the inhibit lead of unit 91 by the output of memory unit 78 prevents the entry of a stop pulse into the encoder until the start pulse J' circulating in the 17 digit delay line has been blocked. The operation of the circuit when the stop pulse occurs during the period while the pulse J' is circulating in the delay loop is considered hereinafter. The one digit delay unit 92 prevents the entry of more than one stop pulse into the delay loop, in the event the stop pulse is more than one microsecond in length.

In order to prevent the introduction of a stop pulse into the digit period delay loop before the start pulse has appeared, the inhibit gate 91 is provided with an input from the memory unit 36 in the word period circuit. The one-half digit delay unit 94 is provided to ensure phase coincidence of the input pulses to the inhibit unit 91.

The memory unit 36 in the word period circuit is reset to its "0" state by the stop pulse output from the inhibit unit 91. The one digit delay unit 93 is required to secure proper timing of the closure of the And gate 37.

The input terminal 96 to the Or unit 88 is energized by number "15½" word pulses. These pulses suppress the carry which would otherwise interfere with the accuracy of the accumulator output when it exceeds its normal capacity and starts another counting cycle.

The time encoder described hereinabove was designed for use as a part of an angle encoder system. In the angle encoder system, a phase shifter shifts the phase of a sinusoidal reference voltage by an angle equal to the rotation of a shaft which represents the analogue function to be encoded. Start pulses are generated as the reference voltage passes from a positive to negative voltage, and stop pulses are generated as the phase shifted voltage makes the transition from positive to negative.

The period of the reference voltage is $2^{11}$ digit times, and this is synchronized with the pulses employed in the time encoder. The time encoder records the number of digit times between the start and the stop signals. Consequently, an angle of 360 degrees corresponds to the number $2^{11}$. The timing circuits of the complete system of Fig. 4 are arranged so that the accumulator output at point N in Fig. 4 represents a digit period pulse as 0 000 000 000 100 000, with the pulse appearing in the sixth time slot or in the number five digit position (zero being the first digit position). Accordingly, the capacity of the time encoder is $2^{11}-1$, and the encoder goes through the same number every $2^{11}$ digit times. Therefore, the same time count is obtained between the start signal and any one of the following stop signals. The foregoing mode of operation permits accurate time encoding even when the first stop signal occurs while the extra digit period logic circuit is processing information related to the start pulse.

When non-repetitive start and stop pulses are employed, the position of the stop pulse in a word frame of reference must be recorded, as in a sixteen digit delay line. After the extra digit period logic operations associated with the start pulse are completed, the stop pulse may be transferred to the delay line of the extra digit logic circuit, where it will be handled as discussed above. Another alternative for non-repetitive operations involves the use of separate extra digit logic circuits for start and stop pulses, and a three input adder.

It is to be understood that the above-described arrangements are illustrative of the application of the principles of the invention. Numerous other arrangements may be devised by those skilled in the art without departing from the spirit and scope of the invention.

What is claimed is:

1. A time interval encoder comprising a standard frequency pulse source having a given period, means for dividing said period into subdivisions, a serial accumulator, means for indicating the beginning and end of a time interval to be measured, means for gating pulses from said standard source to said accumulator indicating the number of integral periods included in said interval, means for gating pulses derived from said standard source and having the same frequency as said standard source to said accumulator indicating the number of extra subdivisions in addition to said integral periods which are included in said interval, and means for spacing the time of application to said accumulator of said pulses indicating integral periods as compared with the pulses indicating extra subdivisions by a time interval corresponding to the ratio of said integral periods to said subdivisions.

2. In a time measurement system, a serial adder having a first repetition rate at which multidigit numbers or words are processed through said adder, a second repetition rate at which the digits making up said numbers are processed through said adder whereby the number of digits is equal to the ratio of said second to said first repetition rate, a standard frequency source of word pulses of said first repetition rate, a first gate coupled in a series circuit between said pulse source and said adder, means including a source of start pulses for opening said first gate at the start of the interval to be timed, means including a source of stop pulses for closing said first gate at the end of the interval to be timed, a second gate connected in series with a source of pulses of said first repetition rate and said adder, logical circuit means coupled to said second gate for opening said second gate and passing a number of word pulses from said last-mentioned pulse source to said adder equal to the number of digit times between the start of said timing interval and the occurrence of the first word pulse after the start of said timing interval, and delay means included in one of said series circuits for reducing the numerical weight of the pulses passing to said adder through said second gate relative to the pulses passing through said first gate.

3. In a time interval encoder, serial means for accumulating multidigit binary numbers at a predetermined periodicity, means for dividing the period of operation of said accumulating means into subdivisions, means for indicating the beginning and end of a time interval to be measured, means for applying signals to said accumulator indicating the number of integral periods included in said interval, means for applying signals to said accumulator indicating the number of extra subdivisions in addition to said integral periods which are included in said interval at the beginning and end thereof, and circuit means for delaying said signals indicating integral periods with respect to said signals representing extra subdivisions by a time interval representing the relative weight of said two signals.

4. In a time interval encoder, a serial binary means for accumulating multidigit binary numbers at a predetermined periodicity, the period of operation of said accumulating means being divided into a number of digit periods equal to a power of two, means for indicating the beginning and end of a time interval to be measured, means for applying signals to said accumulator indicating the number of integral operating periods included in said interval, means for applyng signals to said accumulator indicating the number of digit periods in addition to said integral operating periods which are included in said interval at the beginning and end thereof, and means for spacing the time of application to said accumulator of said signals indicating digit periods as compared with the signals indicating integral operating periods by a time interval corresponding to the ratio of said operating periods to said digit periods.

5. In combination, a serial binary accumulator having a predetermined word repetition period subdivided into digit periods, means providing start and stop pulses defining a time interval to be measured, a source of pulses having a repetition rate equal to the word repetition rate of said accumulator, a word period gate coupled between said pulse source and said accumulator, means for opening said word period gate after the occurrence of said start pulse and for closing said word period gate after the occurrence of said stop pulse, an extra digit period gate coupled between a source of pulses of word repetition rate and said accumulator, an extra digit period logic circuit for opening said extra digit period gate, said digit period logic circuit including a delay loop including a number of digits of delay which differs by one from the number of digit periods in a word period, means for applying said start and said stop pulses to said delay loop and for circulating said start and stop pulses in said delay loop for a number of word periods equal to the number of extra digit periods at the beginning and end, respectively, of said measured time interval, and means for opening said extra digit period gate and permitting the passage of pulses from said last-mentioned source of word pulses while either a start or a stop pulse is circulating in said delay loop.

6. An interval time encoder as defined in claim 5, wherein means are provided for increasing the weight of the pulses from said word period gate as compared with the pulses from said extra digit gate by a factor equal to the ratio of said word periods to said digit periods.

7. In combination, a serial computing apparatus including means for performing arithmetic operations on serial binary numbers each having at least five digits, the repetition period for said binary numbers being equal to a word period and said word periods being subdivided into digit time slots equal to the number of digits in the multidigit numbers, the period between two digit time slots being equal to one digit period, a delay loop having a delay which is one digit period shorter than said word period, said delay loop including means for regenerating and recirculating pulses, a delay line which has a delay of two digit periods, means for selectively switching said two digit delay line into said delay loop, means for inserting pulses into said delay loop, and means for removing said pulses from said delay loop when they appear in the output of said delay doop at a predetermined digit time slot.

8. In a serial binary data processing circuit having a predetermined word repetition period subdivided into at least five digit periods, a delay loop having a delay which is one digit period shorter than said word period, said delay loop including means for regenerating and recirculating pulses, a delay line having a delay of two digit periods, means for selectively switching said two-digit period delay line into said delay loop, means for inserting pulses into said delay loop, means for blocking the circulation of said pulses in said delay loop when they appear in an output portion of said delay loop in a predetermined digit period, an electrical gating circuit having two distinct electrical states, and means for setting the gating circuit to one of said states each time a pulse appears in the output portion of said delay loop.

9. In a serial binary data processing circuit having a predetermined word repetition period subdivided into at least five digit periods, a delay loop having a delay which is one digit period shorter than said word period, said delay loop including means for regenerating and recirculating pulses, a delay line having a delay of two digit periods, means for selectively switching said two-digit period delay line into said delay loop, means for inserting pulses into said delay loop both when said two-digit period delay line is in said delay loop and when it is not included in said delay loop, means for blocking the circulation of said pulses in said delay loop when they appear in an output portion of said delay loop in a predetermined digit period, an electrical gating circuit having two distinct electrical states, means for setting the gating circuit to one of said states each time a pulse appears in the output portion of said delay loop, and additional means for resetting said gate circuit to the other of said states in the digit period following said predetermined digit period.

10. In a serial binary data processing circuit having a predetermined word repetition period subdivided into at least five digit periods, a delay loop having a delay which differs by one digit period from the length of said word period, said delay loop including means for regenerating and recirculating pulses, a delay line having a delay of two digit periods, means for selectively switching said two-digit period delay line into said delay loop, means for inserting pulses into said delay loop both when said two-digit period delay line is in said delay loop and when it is not included in said delay loop, means for blocking the circulation of said pulses in said delay loop when they appear in an output portion of said delay loop in a pretermined digit period, an electrical gating circuit having two distinct electrical states, means for setting the gating circuit to one of said states each time a pulse appears in the output portion of said delay loop, and additional means for resetting said gate circuit to the other of said states in the digit period following said predetermined digit period.

11. In combination, a serial binary accumulator having a predetermined word repetition period subdivided into digit periods, means providing start and stop pulses defining a time interval to be measured, a source of pulses having a repetition rate equal to the word repetition rate of said accumulator, a word period gate coupled between said pulse source and said accumulator, means for opening said word period gate after the occurrence of said start pulse and for closing said word period gate after the occurrence of said stop pulse, an extra digit period gate coupled between a source of pulses of word repetition rate and said accumulator, means for opening said extra digit period gate and permitting the passage of a number of word pulses equal to the number of extra digit periods at the beginning and end of said measured time interval, and means for shifting the time of application to the accumulator of pulses from the two gates to increase the weight of the pulses from said word period gate as compared with the pulses from said extra digit gate by a factor equal to the ratio of said word periods to said digit periods.

12. In combination, a serial binary accumulator having a predetermined word repetition period subdivided into digit periods, means providing start and stop pulses defining a time interval to be measured, a source of pulses having a repetition rate equal to the word repetition rate of said accumulator, a word period gate coupled between said pulse source and said accumulator, means for opening said word period gate for an extended time period to pass a number of pulses equal to the number of integral word periods in said time interval, an extra digit period gate coupled between a source of pulses of word repetition rate and said accumulator, means for opening said extra digit period gate and permitting the passage of a number of word pulses equal to the number of extra digit periods in said interval in addition to said integral word periods, and means for shifting the time of application to the accumulator of pulses from the two gates to increase the weight of the pulses from said word period gate as compared with the pulses from said extra digit period gate by a factor equal to the ratio of said word periods to said digit periods.

References Cited in the file of this patent

UNITED STATES PATENTS

| | | |
|---|---|---|
| 2,603,123 | Loukomsky et al. | July 15, 1952 |
| 2,634,052 | Block | Apr. 7, 1953 |
| 2,641,698 | Gloess et al. | June 9, 1953 |
| 2,665,411 | Frady | Jan. 5, 1954 |